United States Patent [19]

Nakao et al.

[11] 4,339,149
[45] Jul. 13, 1982

[54] CHILD'S AUTOMOTIVE SAFETY SEAT

[75] Inventors: Shinroku Nakao, Yokohama; Yoshiyasu Ishii, Tokyo; Susumu Matsumoto, Tokyo; Kiyoshi Hoshino, Tokyo, all of Japan

[73] Assignee: Combi Co., Ltd., Tokyo, Japan

[21] Appl. No.: 136,639

[22] Filed: Apr. 2, 1980

[30] Foreign Application Priority Data

Apr. 10, 1979 [JP] Japan .................. 54/47056[U]
Apr. 13, 1979 [JP] Japan .................. 54/49222[U]
Apr. 24, 1979 [JP] Japan .................. 54/54802[U]

[51] Int. Cl.³ .................................... B60R 21/10
[52] U.S. Cl. .................... 297/250; 297/216; 297/377
[58] Field of Search ......... 297/377, 250, 253, 254, 297/216, 310, DIG. 2

[56] References Cited

U.S. PATENT DOCUMENTS

| 3,858,936 | 1/1975 | Gerkin ................... 297/DIG. 2 |
| 3,910,634 | 10/1975 | Morris ................... 297/250 X |
| 4,033,622 | 7/1977 | Boudreau ............... 297/250 |

FOREIGN PATENT DOCUMENTS

| 1581136 | 9/1969 | France ................... 297/377 |
| 2322570 | 1/1977 | France ................... 297/377 |

Primary Examiner—James T. McCall
Attorney, Agent, or Firm—Sughrue, Mion, Zinn, Macpeak & Seas

[57] ABSTRACT

A safety seat for children in which the forces generated during a collision are transmitted primarily to a main support pipe. The seat includes a seat body having a bottom portion, a backrest portion, side walls, upper arms and lower arms extending from the rear side of the backrest portion and having through-holes formed therein. A hollow main support pipe having a substantially L-shape from the side and a substantially U-shape from a front view is connected to the seat by upright portions thereof extending through the through-holes in the arms. Moving the main hollow support pipe up and down changes both the height and slant angle of the chair body in accordance with the shape of the automotive seat and size of the child. A seat belt passes through through-holes formed in the seat body and is attached to the main support pipe.

6 Claims, 13 Drawing Figures

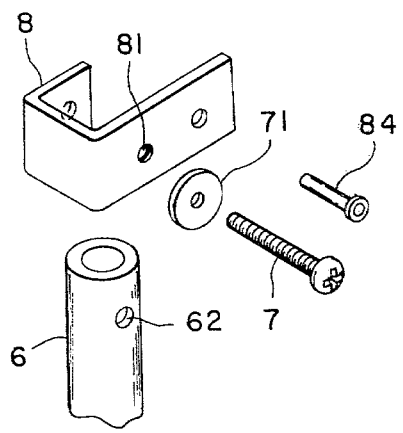
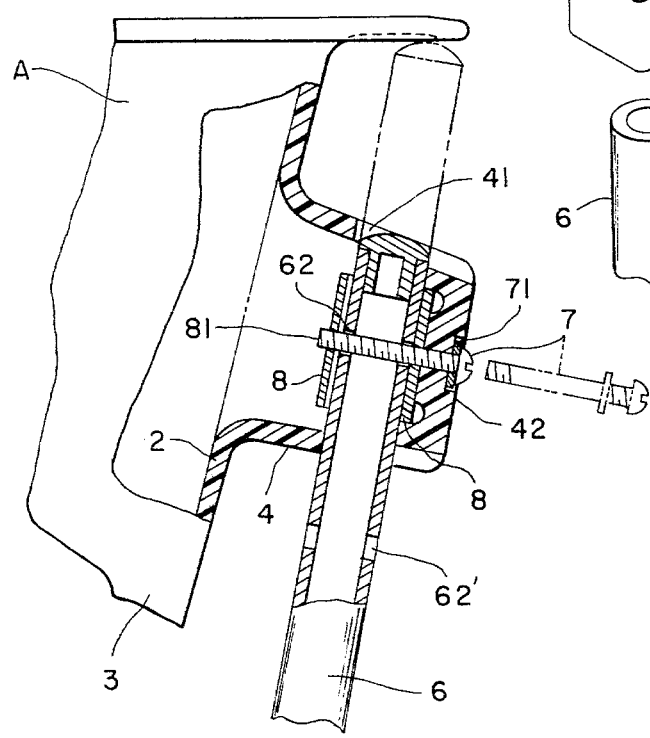
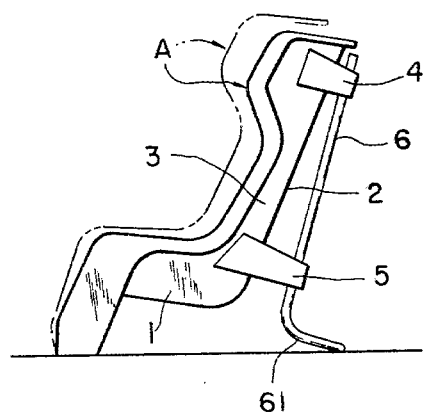
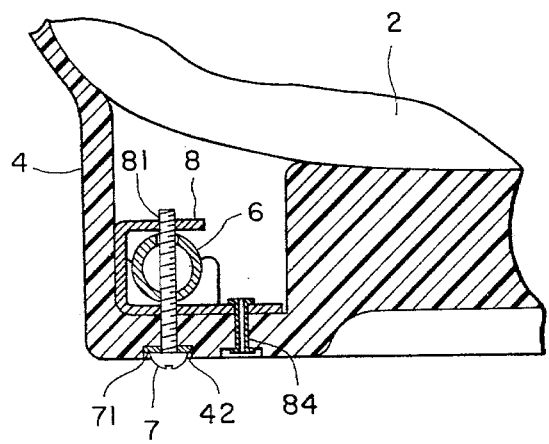

CHILD'S AUTOMOTIVE SAFETY SEAT

BACKGROUND OF THE INVENTION

The present invention relates to a safety seat for children. More particularly, the invention relates to a safety seat for children provided with means for fixedly clamping a seat belt when the seat is used in an automobile.

Safety seats for children which are employed by placing the seat on an automotive seat or by suspending it from a backrest portion of the seat are well known. However, since the prior art safety seat is simply placed on or suspended from the automotive seat and little or no fastening force is provided between the automotive seat and the safety seat, it is difficult to adequately protect a child sitting on the chair in the event of a sudden stop of the vehicle or in a traffic accident.

A safety seat for children has been proposed in which a sub-belt is provided on the seat for restraining the child and with the seat body secured to the automotive seat belt. However, the two ends of the sub-belt are secured to the lower portion and the backrest portion of the seat. Therefore, in the prior art construction, collision or inertial force is concentrated on the attached part of the backrest portion of the automotive seat during a collision or a sudden stop of the vehicle.

SUMMARY OF THE INVENTION

It is thus an object of the invention to provide a safety seat for children in which the disadvantages of the prior art constructions are eliminated. Specifically, it is an object of the invention to provide a safety seat for children in which the collision or inertial forces are not concentrated on the backrest portion of the automotive seat during collision or sudden stop of the vehicle.

In accordance with these and other objects of the invention, there is provided a safety seat for children for use on an automotive seat having an automotive seat belt including a bottom portion, a backrest portion and side walls, at least one upper arm means and at least one lower arm means with each of the arm means extending from the rear side of the backrest portion with through-holes formed therein, a hollow main support pipe having a substantially L-shape from a side view and a substantially U-shape from a front view, and adjusting and fastening means for adjusting the height and slant angle of the chair body in accordance with the shape of an automotive seat in which the safety seat is used and the size of the child occupying the safety seat.

The safety seat of the invention preferably further includes seat belt means which passes through the through-holes formed in the seat body and are attached to the means support pipe. There is also preferably included fastening means including an angled clamping body, a belt clamping plate hinged at one end to one end of the angled clamping body, a press lever hinged at one end to the other end of the clamping plate and which is provided with a pivotable stopper ring and with a claw formed at the other end of the angled clamping body for engagement with the stopper ring. The angled clamping body and the belt clamping plate are adapted for clamping to an automotive seat belt. The fastening means is fixable to the main support pipe. There is yet further preferably included a U-shaped base support pipe for supporting the seat body and which cooperates with the main support pipe. The adjusting and fastening means then includes adjustable connection means operatively connected between the base pipe and main support pipe.

BRIEF DESCRIPTION OF THE DRAWINGS

In the drawings:

FIG. 3 is an enlarged elevational fragmentary view of an adjustable connection between the seat body and a support pipe thereof according to the present invention;

FIG. 4 is an enlarged horizontal cross-sectional view showing the connection of FIG. 3;

FIG. 5 is an exploded view showing the dismantled connection shown in FIGS. 3 and 4;

FIGS. 6 and 7 are illustrations of the adjustable connection according to the present invention;

DESCRIPTION OF THE PREFERRED EMBODIMENTS

The present invention will hereinafter be described with reference to the accompanying drawings.

Figure 1:
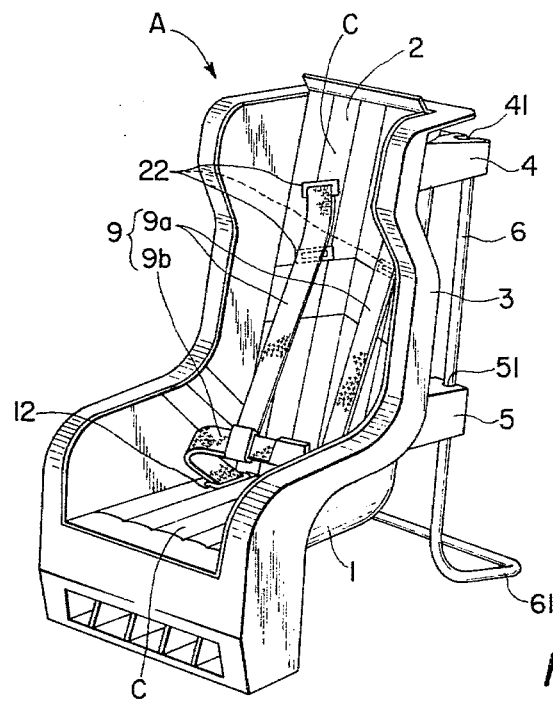
FIG. 1 is a perspective view of a safety seat for children for use in an automotive vehicle according to the present invention.

FIG. 1 shows a perspective view of a child's safety seat particularly intended for use in an automotive vehicle. A seat body generally represented at A is preferably made of polypropylene or other suitable synthetic resin. The seat body A includes a seat bottom portion 1, a backrest portion 2 provided with cushion material C and a pair of side walls 3, the seat bottom portion 1, backrest portion 2 and side walls 3 being integrally formed. The seat body A also includes upper and lower arms 4 and 5 integrally extending from the rear side of the backrest portion 2 substantially horizontally. A support pipe 6 is slidably inserted through upper holes 41 and lower holes 51 which are formed substantially perpendicularly in the upper and lower arms 4 and 5, respectively. At rear end surfaces of the arms 4 and 5 are formed small through-holes 42 and 52 through which fastening pins 7 (FIG. 3) are inserted. The support member 4 is made of a hollow cylindrical pipe having a substantially U-shaped from a front view thereof. If required, the support member may be L-shaped as viewed from a side view to thereby form a base portion which may be inserted into a connection part of an automotive seat S. In the specific embodiment shown in FIGS. 1 and 2, integral lateral arms 4 and 5 in which insert holes 41 and 51 are formed are provided. However, it is possible to use instead four projections extending from the backrest portion 3 with each having a single insert hole. The size of the arms is not limited to those shown. For example, the right and left ends of the molded arms may reach the side walls.

FIG. 3 is an enlarged elevational cross-sectional view of the adjustable connection between the seat body A and the hollow support pipe 6. The above-described pin 7 with a screw thread is inserted into the through-hole 42 in the arm 4 and the hole 62 in the pipe 6 through one part of a threaded hole 81 of angled member 8 and fastened through the other part of the threaded hole 81 formed in the angled member 8. FIG. 4 is an enlarged horizontal cross-sectional view of the connection. The angled member 8 is fixedly secured to an inner corner of the arm 4 by a fastener pin 84. FIG. 5 is an exploded view of the connection. Other adjustment holes 62' are formed in the pipe at suitable intervals as shown in FIG. 3. If the fastener pin 7 is moved to the adjacent lower hole 62' and fastened in the same manner, the slant angle of the seat as well as its height will decrease as shown in FIG. 6.

Figure 7:
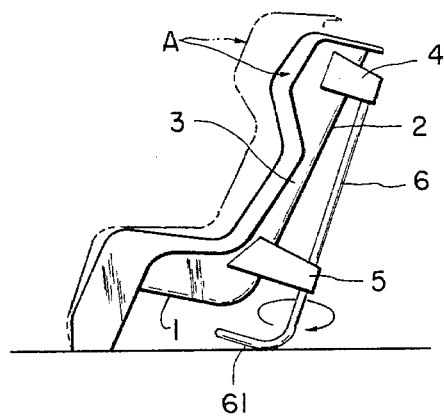

In addition to this adjustment, if required, the pipe fastenings may be disassembled and the lower base portion 61 of the pipe turned as shown in FIG. 7 following which the pipe fastenings are reassembled. The slant angle of the safety seat is then greatly decreased. With such an adjustment, the seat can be made to fit all types of automotive seats.

Figure 8:
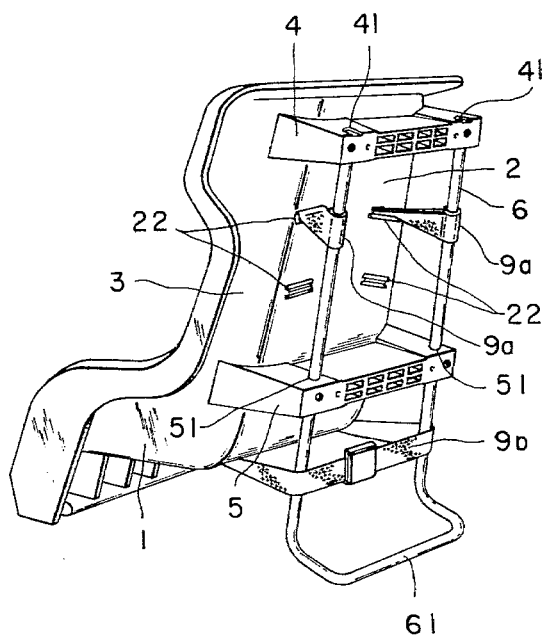
FIG. 8 is a rear view of the safety seat showing a connection between the seat belt and the support pipe.

A preferred manner of fastening belt 9 to the seat body A will be illustrated. Preferably, the fastening belt 9 includes two shoulder belts 9a and a lap belt 9b which together form a harness-type belt assembly. The shoulder belts 9a are connected to intermediate portions of the lap belt 9b at their ends as shown in FIG. 1. Upper and lower holes 22 through which pass shoulder belts 9a are formed in the backrest of the seat while a pair of holes for the lap belt 9b are formed in the bottom portion of the seat. It is desirable that the ends of the shoulder belts 9a which pass through the holes 22 be connected to the pipe 6, and the lap belt 9b which passes through the holes 12 surround both pipe member posts as shown in FIG. 8. In addition to the resiliency of the chair body, this connection provides a safety resiliency to the sitting child due to the flexibility of the support pipe 6 in case of a collision or sudden stop of the vehicle.

Figure 2:
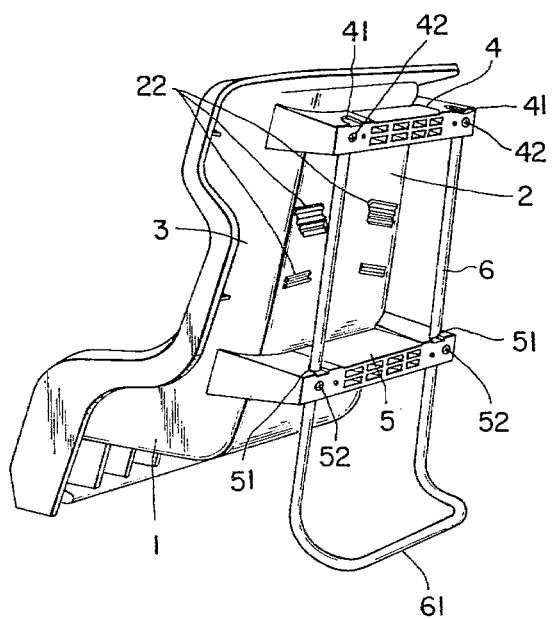
FIG. 2 is a rear perspective view of the safety seat shown in FIG. 1.

Also, it is possible to obtain substantially the same effect by wrapping the ends of the lap and shoulder belts around both support posts. It is of course possible to connect the shoulder and lap belts as best shown in FIG. 2 in which the shoulder belts are prevented from withdrawing from the backrest simply by end fastenings and the lap belt is secured to the seat bottom in a suitable manner. With the above-described construction in which the fastening belt 9 is connected to the support pipe 6, the force generated in a collision or sudden stop of the vehicle is diffused from the fastening belt to the support pipe 6.

Figure 9:
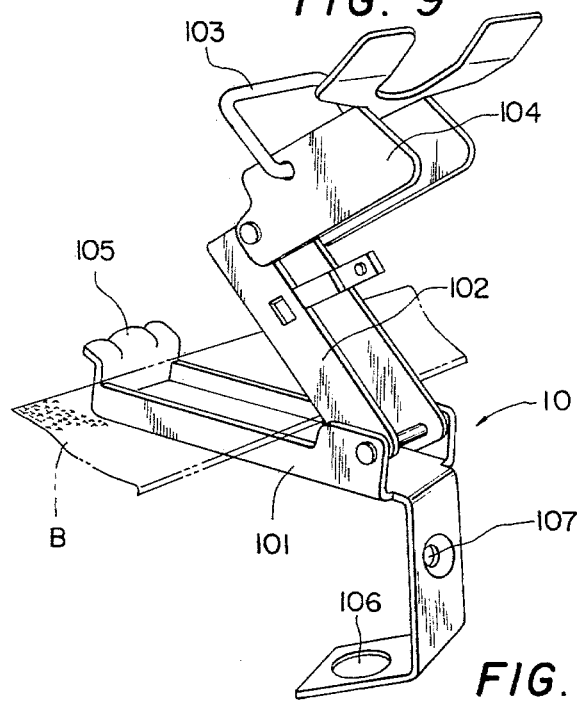
FIGS. 9 and 10 are views showing the fastening device for releasing the automotive seat belt and clamping the automotive seat belt according to the present invention.
Figure 10:
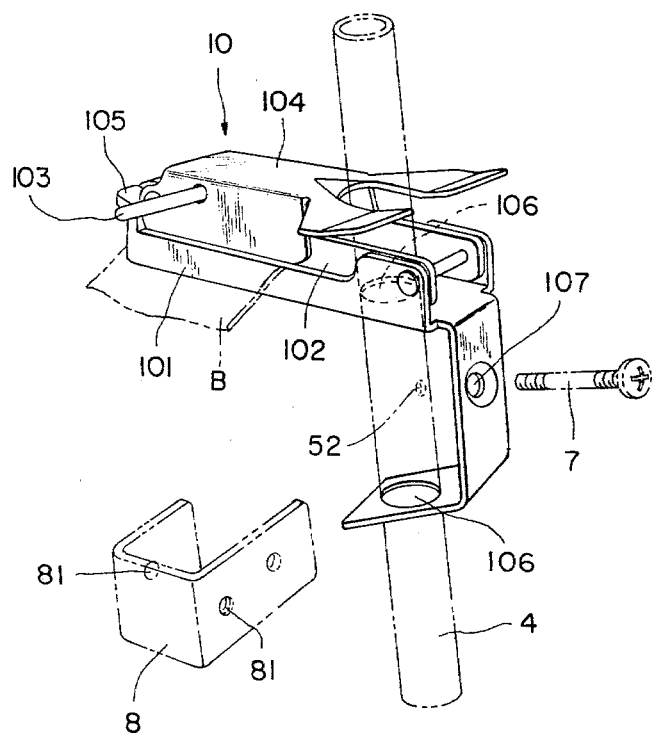

FIG. 9 shows an automotive seat belt fastening 10 for fixedly clamping an automotive seat belt B. A belt clamping plate 102 is hinged at one end to an angled clamping body 101 and the belt clamping plate 102 is hinged at the other end to a press lever 104 having a stopper ring 103 at an end portion thereof. The stopper ring 103 is engageable with a stopper claw 105 formed at the front end of the angled clamping body 101. A hole 107 formed in the angled clamping body 101 receives the above described fastener pin 7 which extends through the hole 52 of the lower arm 5 to the angled member 8. Two insert holes 106 are formed in the angled clamping body 101 through which pass the support pipe 6 as shown in FIG. 10.

Figure 11:
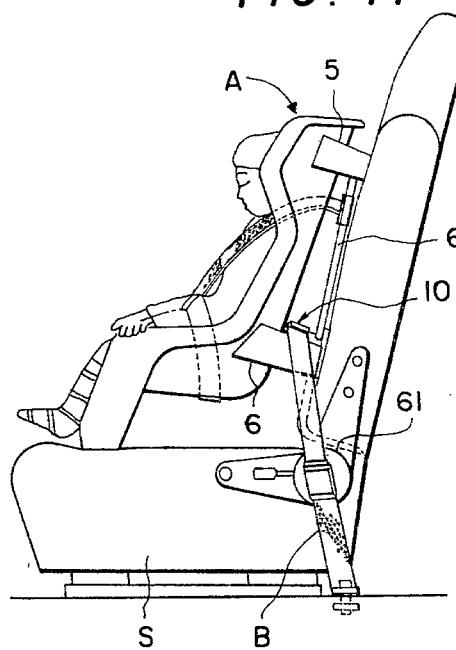
FIG. 11 is a side view of the safety seat of the invention in use.

FIG. 11 shows the seat body A which is secured to the automotive seat S and the seat belt B. In this state, even if the fastening to the seat belt is loosened to some extent, it is possible to prevent the seat body A from being displaced in the lateral direction by the seat belt fastening 10. A plurality of the seat belt fastenings 10 may be used.

In the present invention, since the basic angled clamping body 101 of the fastening 10 is in the specific form shown and is provided with the two holes 106 through which the pipe 6 is inserted, the fastening 10 will not be twisted in case of application of force due to a collision. It is possible to prevent the seat from displacing not only in the forward direction but also in the lateral direction.

Figure 12:
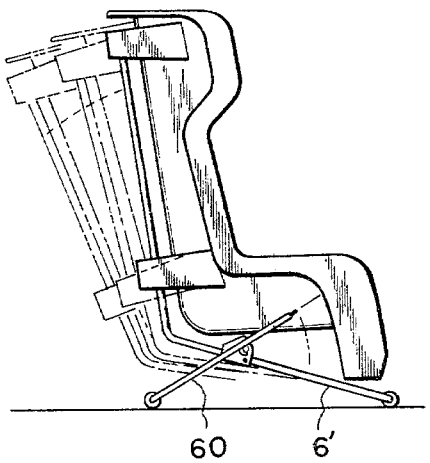
FIGS. 12 and 13 show a modification of a slant angle adjustment mechanism according to the present invention.
Figure 13:
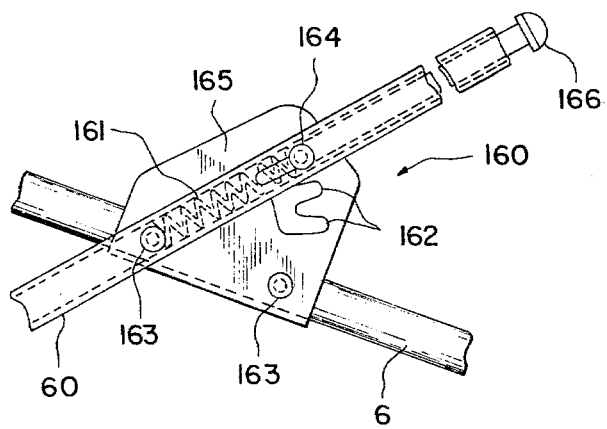

FIGS. 12 and 13 show a modification of the seat slant angle adjusting mechanism. A support pipe member 6' similar to the pipe member 6 is used as shown in FIG. 11 and a separate base pipe 60 is connected thereto by a connection mechanism 160 including a spring 161 disposed between a pin 163 fixed to the separate base pipe 60 and a pin 164 fixed to a spring biased push lever pipe 166 through an oblong hole formed in the base pipe 60. The pin 164 is movable in the axial direction of the base pipe 60 by the depression of the push lever 166 and may be changed to other concave grooves 162 formed in a plate 165 to change the slant angle of the seat as shown in FIG. 12.

What is claimed is:

1. A safety seat for children for use on an automotive seat having an automotive seat belt comprising: a seat body having through-holes formed therein including a bottom portion, a backrest portion and side walls, at least one upper arm means and at least one lower arm means, each arm means extending from a rear side of said backrest portion and having second through-holes formed therein, a hollow main support pipe having a substantially L-shape from a side view and a substantially U-shape from a front view being disposed in said second through-holes formed in said arm means, and adjusting and fastening means for determining a relative position between said main support pipe and said upper and lower arm means for adjusting the height and slant angle of said seat body in accordance with the shape of said automotive seat and size of a child, said adjusting and fastening means fastening said main support pipe to an end of said lower arm means so that said automotive seat belt can be fastened over said lower arm means so as to keep said safety seat from moving in a forward direction.

2. The safety seat as defined in claim 1 further comprising seat belt means passing through said through-holes formed in said seat body and being attached to said main support pipe.

3. A safety seat for children for use on an automotive seat having an automotive seat belt comprising: a seat body having through-holes formed therein including a bottom portion, a backrest portion and side walls, at least one upper arm means and at least one lower arm means, each arm means extending from a rear side of said backrest portion and having second through-holes formed therein, a hollow main support pipe having a substantially L-shape from a side view and a substantially U-shape from a front view being disposed in said second through-holes formed in said arm means, adjusting and fastening means for determining a relative position between said main support pipe and said upper and lower arm means for adjusting the height and slant angle of said seat body in accordance with the shape of said automotive seat and size of a child, and second fastening means including an angled clamping body, a belt clamping plate hinged at one end to one end of said angled clamping body, a press lever hinged at one end to the other end of the clamping plate and provided with a pivotable stopper ring, and a claw formed at the other end of the angled clamping body for engagement with said stopper ring, said angled clamping body and said belt clamping plate being adapted for clamping said automotive seat belt, and said fastening means being fixable to said main support pipe.

4. The safety seat as defined in claim 1 further comprising a U-shaped base pipe for supporting said seat body and cooperating with said main support pipe and wherein said adjusting and fastening means includes adjustable connection means operatively connected between said base pipe and said main support pipe.

5. The safety seat as defined in claim 1, wherein said main support pipe is fastened to said upper and lower arm means by said adjusting and fastening means so that a bottom portion of said main support pipe extends away from said seat body.

6. The safety seat as defined in claim 1, wherein said main support pipe is fastened to said upper and lower arm means by said adjusting and fastening means so that a bottom portion of said main support pipe extends towards said seat body.

* * * * *